United States Patent [19]
Ogawa

[11] Patent Number: 5,781,524
[45] Date of Patent: Jul. 14, 1998

[54] HIGH DENSITY OPTICAL HEAD ASSEMBLY

[75] Inventor: Masatsugu Ogawa, Tokyo, Japan

[73] Assignee: NEC Corporation, Japan

[21] Appl. No.: 785,169

[22] Filed: Jan. 13, 1997

[30] Foreign Application Priority Data

Jan. 19, 1996 [JP] Japan ................... 8-007858

[51] Int. Cl.$^6$ ................................................ G11B 7/00
[52] U.S. Cl. .................... 369/112; 369/44.23; 369/110
[58] Field of Search ............................. 369/112, 110,
369/109, 117, 32, 13, 44.23, 44.24, 44.12

[56] References Cited

U.S. PATENT DOCUMENTS

| | | | |
|---|---|---|---|
| 4,451,863 | 5/1984 | Yanagida et al. | 369/110 |
| 4,507,773 | 3/1985 | McCann et al. | 369/110 |
| 5,237,549 | 8/1993 | Shimozawa | 369/110 |
| 5,381,395 | 1/1995 | Okada | 369/112 |
| 5,418,774 | 5/1995 | O'Hara et al. | 369/111 |
| 5,432,760 | 7/1995 | Yoshizawa et al. | 369/110 |

OTHER PUBLICATIONS

"High Track Density Magneto-Optical Recording using a Crosstalk Canceler" Kayanuma et al. SPIE vol. 1316 Optical Data Storage (1990); pp. 35–39.

"Mo System Using a Short Wavelength Light Source" Fukumoto et al Proceedings of magneto-Optical Recording International Symposium; '94, J. Magn. Soc. Jpn., vol. 19; Supplement No. S1(1995) pp. 295–300.

*Primary Examiner*—Nabil Hindi
*Attorney, Agent, or Firm*—Hayes, Soloway, Hennessey, Grossman & Hage, P.C.

[57] ABSTRACT

A magneto-optical (MO) head has a pair of Faraday rotators between a polarizing beam splitter (PBS) and an objective lens for focusing light onto a MO disk. The pair of Faraday rotators rotate the direction of polarization of the light by 90° or pass the same as it is depending on the data area where data are read by the optical head. This enables the MO head for reproducing data recorded by a land-groove technique to reduce output level difference and cross-talk between a land area and a groove area, thereby improving C/N of the reproduced signal.

8 Claims, 4 Drawing Sheets

HIGH DENSITY OPTICAL HEAD ASSEMBLY

BACKGROUND OF THE INVENTION (a) Field of the Invention:

The present invention relates to a high density optical head assembly and, in particular, to a high density optical head assembly adapted for a high density optical disk such as a magneto-optical disk.

(b) Description of the Related Art:

Optical disks and optical head assemblies are increasingly used because of their high density recording capability. A conventional magneto-optical (MO) head assembly shown in FIG. 1 will be described herein as an example of the optical head assembly, with reference to FIG. 2 showing the direction of the polarization of the light incident on the MO disk shown in FIG. 1. In the MO head of FIG. 1, a light beam polarized in the direction (first direction 16 as viewed in FIG. 2) perpendicular to a spiral groove formed on the MO disk 11 is irradiated from a semiconductor laser 15. A polarizing beam splitter (PBS) 13 and PBS 14 are designed so that they pass 70% to 90% of light polarized in a direction parallel to the first direction 16 in which the irradiated light beam from the semiconductor laser 15 is polarized, and reflect almost 100% of light polarized in a direction (second direction 15 as shown in FIG. 2) which is perpendicular to the first direction 16. Accordingly, most of the original light beam irradiated from the semiconductor laser 15 passes though the PBS 13, PBS 14 and objective lens 12 so as to be reflected by the MO disk 11.

The reflected light beam, to which a light component polarized in the second direction 15 is added by the magneto-optical effect (MO effect) of the MO disk 11, returns through the optical path traversed by the original beam. The light component of the reflected beam which is added to the incident light by the MO effect and polarized in the second direction 15 is deflected by the PBS 13 almost entirely to a reproducing section of the head assembly. On the other hand, the first light component of the reflected light beam polarized in the first direction 16 is deflected in an amount equal to 10% to 30% to the reproducing section. The light component passing again through the PBS 13 is deflected in an amount equal to 10% to 30% by the PBS 14 to a servo section of the head assembly.

In a MO head assembly, a tracking servo system is generally used for assuring reliable recording/reproducing operation. For this purpose, the MO disk has a spiral guide groove configuration defining a land area and a groove area on the recording surface of the MO disk for guiding the optical spot irradiated from the MO head. A push-pull method or three-beam method, for example, is employed for tracking of the optical spot, which is guided along the land area or groove area. The guide groove configuration formed on the MO disk affects the reflected light from the MO disk such that the output level of the reproduced signal depends on the configuration of the guide groove and on the direction of polarization of the incident beam.

Recently, one high density recording technique which has attracted attention has been employed, which techniques uses a land-groove recording technique, and wherein data are recorded on both the land area and groove area defined by the guide groove so as to double recording density, and is described, for example, by Kayanuma et al., Proc. SPIE. 1316 1990, pp. 35-39.

FIG. 3 shows recording frequency dependence of the carrier level in a reproduced signal, with the parameters for reproducing conditions such as the direction of polarization of the incident light or data area for reproduction, i.e., land area or groove area. As illustrated in the figure, the carrier level depends on the reproducing conditions. It will be understood from the figure that the difference in the carrier level is caused by the guide groove configuration because it is known that the output level of the reproduced signal from a magnetic body having a planar surface does not depend upon direction of polarization.

Specifically, in the land-groove recording technique, the reproduced output signal generally includes a level difference of several decibels (dB) between the land area and groove area, as shown in FIG. 3, so long as a polarized light beam is used for reproduction. This presents a problem in designing a disk drive because such a difference hinders the disk drive from reproducing a stable output signal as an unstable input signal does. It further presents a problem of large cross-talk from the land area to the groove area when reproducing data on the groove area by using a light beam polarized in the first direction 16, for example, although such cross-talk is not so serious when reproducing data on the land area.

SUMMARY OF THE INVENTION

It is therefore an object of the present invention to provide an optical head assembly which is capable of reproducing a stable output from an optical disk having a guide groove configuration and of reducing cross-talk between adjacent tracks.

In accordance with a first aspect of the present invention, there is provided a high density optical head assembly for an optical head, comprising a light emitting element for emitting first light having a first light component polarized in a first direction, a first polarizing beam splitter for transmitting the first light component, a rotating element for selectively rotating the direction of polarization of or transmitting unchanged the first light component transmitted by the first polarizing beam splitter so as to generate second light, an objective lens for focusing the second light onto the optical disk, the optical disk reflecting the second light to provide reflected light to the first beam splitter through the objective lens and rotating element, and a reproducing section for reproducing data recorded on the optical disk, the first beam splitter deflecting to the reproducing section a second light component in the reflected light polarized in the first direction.

According to a second aspect of the present invention, there is provided a optical head assembly for a MO disk, comprising a light emitting element for emitting first light having a first light component polarized in a first direction, a first polarizing beam splitter for transmitting the first light component, an objective lens for focusing the first light component transmitted by the first polarizing beam splitter so as to irradiate a second light onto the optical disk, the optical disk reflecting the second light to provide reflected light including the first light component and a second light component polarized in a second direction perpendicular to the first light component, a Babinet-Soleil compensator for receiving the reflected light through the objective lens so as to provide third light, and a reproducing section for reproducing data recorded on the optical disk based on the third light.

The high density optical head assembly according to the present invention provides a high C/N ratio and reduced level difference in reproduced output between adjacent tracks, for example, between land and groove area, so as to enable easy design of the optical disk drive if the optimum direction of the polarization is selected depending on the data area, i.e. land area or groove area.

The high density optical head assembly further provides reduced level of cross-talk between adjacent tracks, for example, between the tracks on the land area and groove area.

Especially in a land-groove recording technique of a MO disk, the optical head assembly according to the present invention can provide an excellent reproduced output signal so as to enable reproduction from a large capacity MO disk drive.

The above and other objects, features and advantages of the present invention will be more apparent from the following description, referring to the accompanying drawings.

DESCRIPTION OF THE PREFERRED EMBODIMENTS

Figure 1:
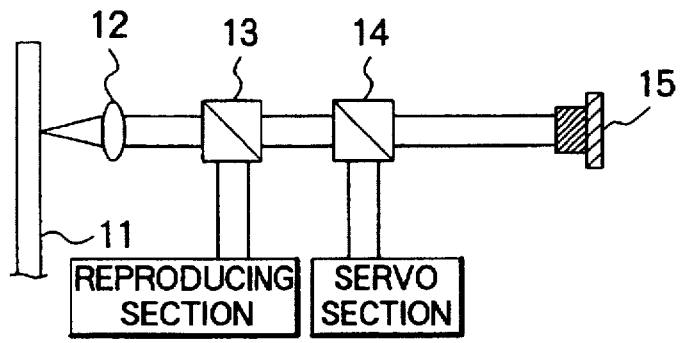
FIG. 1 is a schematic block diagram of a conventional optical head assembly.

Several embodiments of the invention will now be specifically described with reference to the drawings, in which similar constituent elements are designated by the same reference numerals for better understanding.

Figure 4:
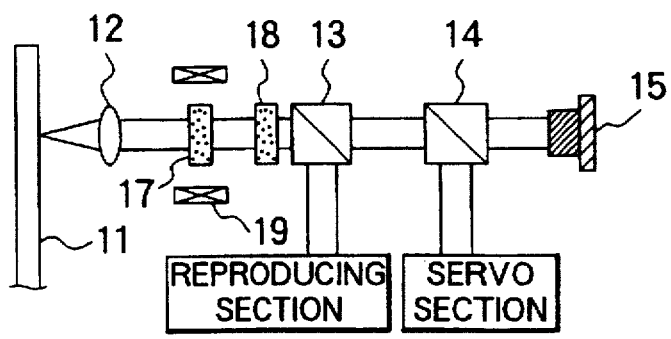
FIG. 4 is a schematic block diagram of an optical head assembly according to a first embodiment of the present invention.

Referring to FIG. 4, the optical head assembly according to the first embodiment includes a semiconductor laser 15 for generating a light beam, an optical system including a first PBS 14, a second PBS 13 and an objective lens 12 for irradiating the light beam from the semiconductor laser 15 onto a MO disk 11, all of which are similar to those included in the conventional optical head assembly of FIG. 1. The optical head assembly of FIG. 4 further includes first and second Faraday rotators 18 and 17 between the second PBS 13 and objective lens 12, and a solenoid coil 19 for controlling magnetization of the second Faraday rotator 17.

Figure 2:
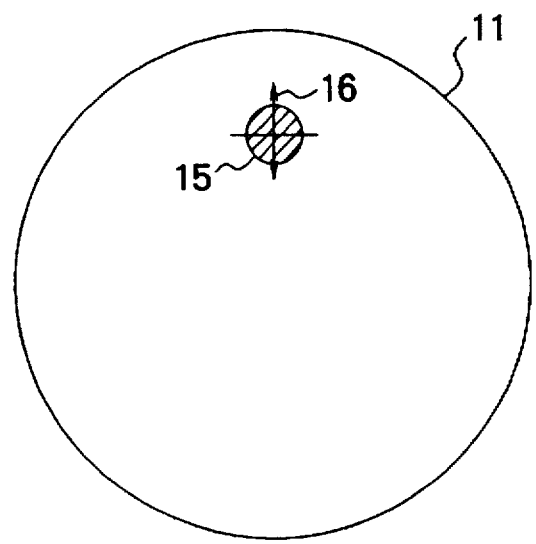
FIG. 2 is a plan view of a MO disk as an example of a general optical disk for showing directions of polarization of incident light.
Figure 3:
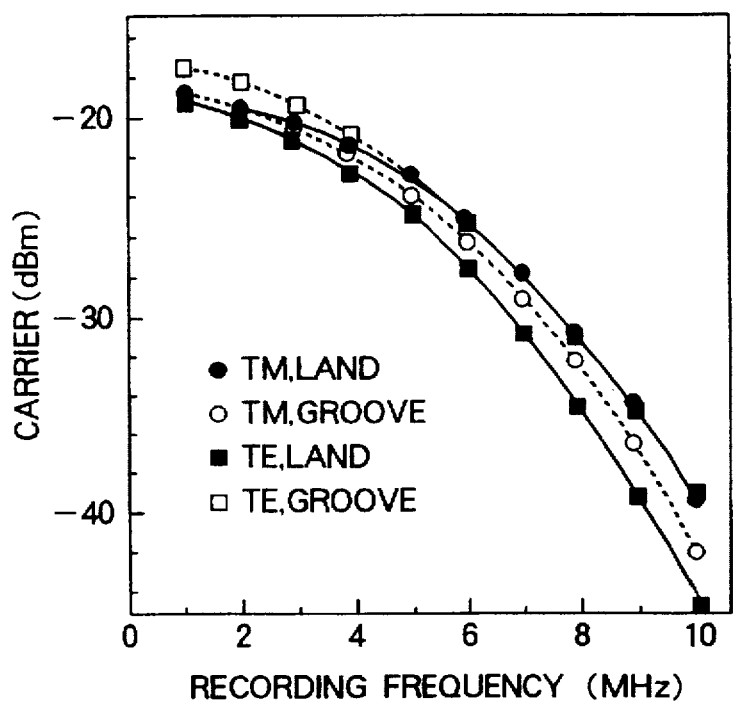
FIG. 3 is a graph for showing recording frequency dependence of the carrier level for the conventional optical head of FIG. 1, with the parameters of directions of polarization (TM or TE) and data area (land area or groove area)

The numerical aperture (NA) of the objective lens 12 and laser wavelength from the semiconductor laser 15 are 0.55 and 685 nm, respectively. The direction (first direction) 16 of the polarization of the laser beam may be exemplarily selected so as to be perpendicular to the guide groove formed on the MO disk 11, as shown in FIG. 2. The first PBS 14 transmits 70% and deflects (orreflects) 30% of the light polarized in the first direction 16, whereas it deflects 98% of light polarized in the second direction 15 perpendicular to the first direction 16. The second PBS 13 transmits 90% and deflects 10% of the light polarized in the first direction 16, whereas it deflects 98% of the light polarized in the second direction 15. The first and second Faraday rotators 18 and 17 are made of $Gd_{1.8}Bi_{1.2}Fe_5O_{12}$.

In this embodiment, the first Faraday rotator 18 is provided with a magnetic shield (not shown) made of permalloy for surrounding the Faraday rotator 18, although the magnetic shield itself is not essential for the present invention. Examples of other materials for Faraday rotators 18 and 17 include yttrium-iron-garnet (YIG) and rare-earth iron garnet (RIG) , and examples of materials for the magnetic shield include soft magnetic materials such as pure iron and Sendust.

In operation, the light beam generated by the semiconductor laser 15 travels so as to transmit the first and second PBS 14 and 13, as in the conventional optical head assembly. The Faraday rotators 17 and 18 are arranged such that the direction of polarization of the light transmitted by each of the Faraday rotators 18 and 17 is rotated by 45°. The direction of the polarization of the light transmitted through the second PBS 13 is rotated by 45° by the first Faraday rotator 18, and the light further travels to the second Faraday rotator 17, whereby the direction of polarization of the light is further rotated by the second Faraday rotator 17 by 45° in the same sense as the first Faraday rotator 18 or the opposite sense thereto depending on the direction of magnetization of the magnetic material in the second Faraday rotator 17, the direction of the magnetization being reversibly selected by the solenoid coil 19.

Specifically, the direction of the magnetization of the second Faraday rotator 17 can be changed so as to arbitrarily select the direction of polarization of the light into the first direction 16, i.e., perpendicular to the guide groove, or the second direction 15, i.e., parallel to the guide groove. The light rotated in the direction of the polarization thereof by the second Faraday rotator 17 and reflected by the MO disk 11 again transmits the Faraday rotators 17 and 18 so as to be rotated in the direction of the polarization by 45° by each of the Faraday rotators 17 and 18 and so as to recover the original direction of polarization, i.e., first direction 16.

The optical head assembly according to the first embodiment was fabricated and used to reproduce data recorded by a land-groove recording technique on a MO disk. The MO disk had a structure which may be expressed as follows:

PC/SiNx(66)GdFeCo(30)/TbFeCo(30)/SiNx(130)/Al(40), wherein PC means polycarbonate substrate, SiNx means nitrogen-omitted silicon nitride, and numerals in parentheses mean film thickness in millimeters (mm). The MO disk may be replaced by any of MO disks of an ordinary reflective type. The disk may also be replaced by an optical card having a rectangular configuration. A sequence of sample marks having 0.5 micron length were recorded on the MO disk in a 0.5 micron pitch during fabrication thereof, and the sample marks were read by the optical head assembly according to the embodiment.

Data were reproduced from the land area by using TM polarized light, or light polarized in the first direction perpendicular to the guide groove. Data are also reproduced from the groove area by using TE polarized light, or light polarized in the second direction parallel to the guide groove, which direction is obtained by changing the direction of magnetization of the second Faraday rotator 17. Both these reproduced output data exhibited a ratio of carrier level to noise (C/N) of about 53 decibels, which indicated that excellent reproduction could be obtained from the land-groove recorded data. For comparison, data were also read from both the land area and groove area by using the light beams polarized in the same direction, and the reproduced output data exhibited a difference of about 3 decibels in C/N between the areas. Further, a larger cross-talk of 6 decibels was observed between adjacent tracks in the latter case. These examples assured that an excellent reproduction could be obtained in the optical head assembly by selecting optimum directions of polarization depending on the data area.

In the first embodiment, the second Faraday rotator 17 located adjacent to the objective lens 12 is exemplarily rotated in its magnetization by the solenoid coil 19. However, the first Faraday rotator 18 can be rotated in its magnetization instead.

Figure 5:
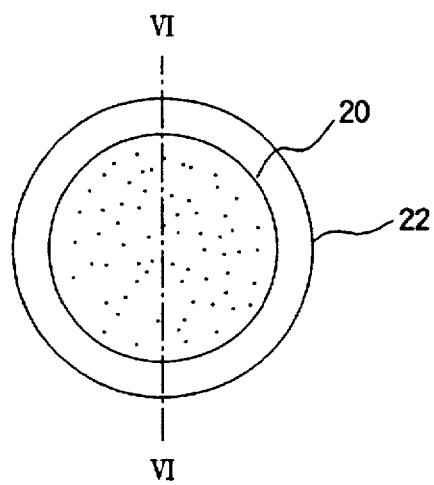
FIG. 5 is a plan view of a modified Faraday rotator assembly compared to the Faraday rotators shown in FIG. 4.
Figure 6:
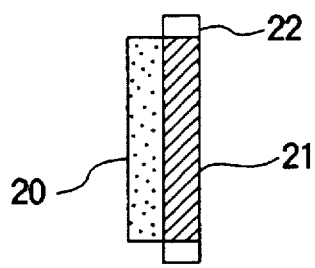
FIG. 6 is a cross-sectional view of the Faraday rotator assembly of FIG. 5, taken along line VI—VI in FIG. 5.

FIG. 5 shows a modification of the first embodiment, wherein a combination of Faraday rotators is included instead of the separate Faraday rotators 17 and 18 arranged apart from each other in the direction of light propagation in the first embodiment. FIG. 6 shows a cross-section of the Faraday rotator combination of FIG. 5 taken along line VI—VI in FIG. 5. In this modification, a pair of Faraday rotators 20 and 21 are bonded to each other with the optical axes thereof being aligned, whereby each of the Faraday rotators 20 and 21 rotates the direction of polarization by 45°. A magnetic shield 22 is attached to the Faraday rotator 21 for surrounding the same. The Faraday rotator assembly of FIG. 5 functions similarly to separate Faraday rotators 17 and 18 because only the direction of magnetization of the Faraday rotator 20 can be rotated when the Faraday rotator assembly is disposed within the magnetic field generated by the solenoid coil 19 shown in FIG. 4.

Faraday rotators 20 and 21 are made of, for example, $Gd_{1.8}Bi_{1.2}Fe_5O_{12}$, or other materials such as YIG and RIG. The magnetic film shield is made of, for example, permalloy or other soft magnetic materials such as pure iron or Sendust. A modified embodiment having the Faraday rotator assembly of FIGS. 5 and 6 was fabricated and exhibited excellent results similarly to those of the first embodiment.

In the modified embodiment, the Faraday rotator assembly can be arranged in either sense within the optical path, whereby either Faraday rotator 20 or 21 may be located adjacent to the objective lens 12. The circular configuration of the Faraday rotators 20 and 21 may be replaced by another configuration such as a rectangular shape.

Figure 7:
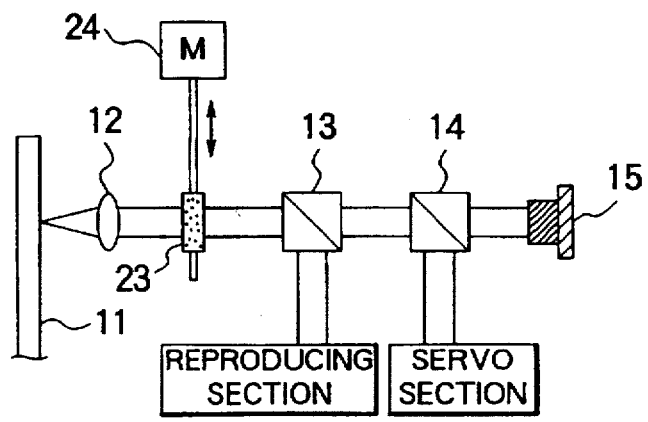
FIG. 7 is a schematic block diagram of an optical head assembly according to a second embodiment of the present invention.

Referring to FIG. 7 showing an optical head assembly according to the second embodiment of the present invention, the optical head assembly has a half-wavelength plate 23 instead of the Faraday rotators 17 and 18 and the solenoid coil 19 in the first embodiment. The half-wavelength plate 23 is reciprocally shifted by a liner motor 24 so as to be inserted into or extracted from the optical path between the second PBS 13 and the objective lens 12, which are similar to those in the first embodiment.

Specifically, the second embodiment has the same configuration as that of the first embodiment except that the half-wavelength plate 23 is provided instead of Faraday rotators. When the half-wavelength plate 23 is inserted within the optical path, the direction of polarization of the light from the PBS 13 is rotated by 90° to thereby provide a TE light beam for reproduction. The half-wavelength plate 23 may be replaced by a Faraday rotator which provides a 90° rotation in the direction of polarization for the transmitted light. By this configuration, the optical head assembly of FIG. 7 functions similarly to the conventional optical head of FIG. 1 when the half-wavelength plate is not inserted, whereas the optical head assembly of FIG. 7 functions for irradiating the light polarized in the second direction perpendicular to the first direction when the half wavelength plate 23 is inserted into the optical path.

Specifically, when the half-wavelength plate 23 is inserted, the reflected light from the MO disk 11 again passes the half-wavelength plate 23 to be rotated by 90° and to return into the original direction of polarization. In this manner, the direction of the polarization of incident light to the MO disk 11 is selected by inserting or extracting the half-wavelength plate 23 into or from the optical path while assuring original direction at the PBS 13 and PBS 14. The optical head assembly of FIG. 7 was fabricated and exhibited excellent results similar to those of the first embodiment.

Figure 8:
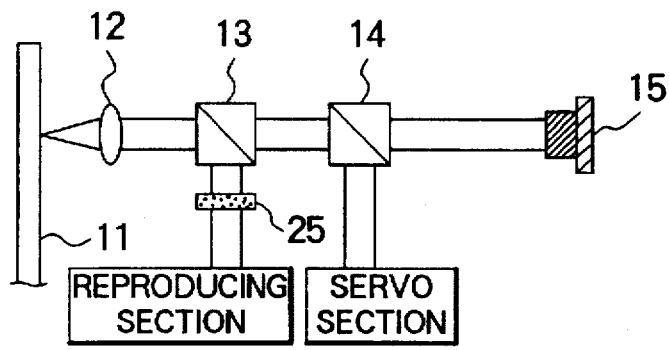
FIG. 8 is a schematic block diagram of an optical head assembly according to a third embodiment of the present invention.

Referring to FIG. 8, an optical head assembly according to the third embodiment of the present invention includes a Babinet-Soleil compensator 25. The principle of this embodiment will be first described with reference to FIG. 9, which shows dependency of carrier level upon phase difference ($\Delta\phi$) between the light polarized in the first direction 16 and the light polarized in the second direction 15, both of which are used in the reproducing section of a general optical head assembly.

Figure 9:
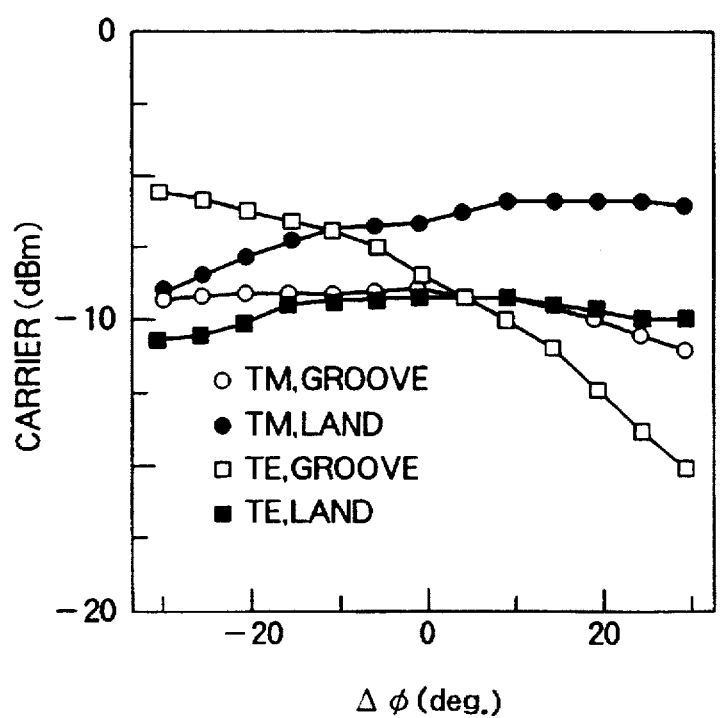
FIG. 9 is a graph for showing, in a manner similar to FIG. 2, recording frequency dependence of the carrier level for a general optical head.

As illustrated in FIG. 9, optimum values of phase difference for the reproducing section depend on the direction of polarization (i.e., either TM or TE polarized light) and data area (i.e., either land or groove area). Accordingly, optimum reproduction can be obtained by changing the phase difference between the light component having the first direction 16 of polarization and the light component having the second direction 15 of polarization perpendicular to the first direction 16, as well as by employing the techniques described in the first and second embodiments. The Babinet-Soleil compensator 25 provides a desired phase difference between light components having the first direction 16 and the second direction 15 of the polarization.

The third embodiment has the same configuration as the conventional optical head assembly of FIG. 1 except for the Babinet-Soleil compensator 25. The light beam deflected by the second PBS 13 into the reproducing section and having polarized light components of the first and second direction has a desired phase difference between both the components by controlling the Babinet-Soleil compensator 25. The optical head assembly of FIG. 8 was fabricated and exhibited excellent results similar to those achieved by the first and second embodiments.

In a reproducing operation using the optical head assembly of FIG. 4, either applying or stopping of magnetic field by the solenoid coil 19, or otherwise, selectively reversing the magnetic field by the solenoid coil 19, may be preferably effected in synchrony with a track jump operation of the optical head assembly. In the optical head assembly of FIG. 7, the half-wavelength plate 23 may be inserted into or extracted from the optical path in synchrony with the track jump operation. Also, in the optical head assembly of FIG. 8, the amount of phase compensation may be changed by the Babinet-Soleil compensator 25 in synchrony with the track jump operation.

Specifically, in the optical heads according to the embodiments as described above, it is determined whether or not the data area for reproduction in terms of the land area or groove area is changed by the track jump operation during the reproduction. After determination that the data area is changed from the land area to groove area or from the groove area to land area, in the optical head of FIG. 4, the magnetic field is applied or stopped by the solenoid coil 19, or the direction of the magnetic field is reversed by the solenoid coil 19. In the optical head of FIG. 7, after the judgment, the half-wavelength plate 23 is inserted or extracted, and in the optical head of FIG. 8, the amount of phase difference is changed by the Babinet-Soleil compensator 25.

Although the present invention is described with reference to preferred embodiments thereof, the present invention is not limited thereto and it will be apparent to those skilled in the art that various modifications and alternatives can be easily made therefrom without departing from the scope of the present invention as set forth in the appended claims.

What is claimed is:

1. A high density optical head assembly for an optical disk having at least one guide groove, said optical head assembly comprising a light emitting element for emitting first light having a first light component polarized in a first direction, a half-wavelength plate selectively inserted into or extracted from a first location in an optical path of the first light, for selectively rotating by 90° the direction of polarization of or transmitting unchanged the first light component depending upon whether said plate is inserted into or extracted from said first location so as to generate second light, an objective lens for focusing the second light onto the optical disk, the optical disk reflecting the second light so as to provide reflected light to a first beam splitter through said objective lens and first location, and a reproducing section for reproducing data recorded on the optical disk, said first beam splitter for deflecting to said reproducing section a second light component of the reflected light polarized in the first direction, said first location being between said objective lens and said first beam splitter.

2. A high density optical head assembly for an optical disk having at least one guide groove, said optical head assembly comprising a light emitting element for emitting first light having a first light component polarized in a first direction, a first polarizing beam splitter for transmitting the first light, a single Faraday rotator selectively inserted into or extracted from a first location in an optical path of the first light for selectively rotating by 90° the direction of the polarization of or transmitting unchanged the first light component passed by the first polarizing beam splitter so as to generate second light, an objective lens for focusing the second light onto the optical disk, the optical disk reflecting the second light so as to provide reflected light to said first beam splitter through said objective lens and Faraday rotator, and a reproducing section for reproducing data recorded on the optical disk, said first beam splitter deflecting to said reproducing section a second light component of the reflected light polarized in the first direction, said first location being between said objective lens and said first polarizing beam splitter.

3. A high density optical head assembly as defined in claim 2, said optical head assembly further comprising a solenoid coil for applying a magnetic field to said Faraday rotator.

4. A high density optical head assembly for an optical disk having at least one guide groove, said optical head assembly comprising a light emitting element for emitting first light having a first light component polarized in a first direction, a first polarizing beam splitter for transmitting the first light component, a pair of Faraday rotators each for effecting rotation of polarization by 45° and arranged along the optical path of the first light component, one of said pair of Faraday rotators effecting rotation selectively in a first sense or a second sense opposite to the first sense to thereby generate second light, an objective lens for focusing the second light onto the optical disk, the optical disk reflecting the second light to provide reflected light to said first beam splitter through said objective lens and pair of Faraday rotators, and a reproducing section for reproducing data recorded on the optical disk, said first beam splitter deflecting to said reproducing section a second light component of the reflected light polarized in the first direction, said pair of Faraday rotators being, located between said objective lens and said first beam splitter.

5. A high density optical head assembly as defined in claim 4, wherein said pair of Faraday rotators are bonded to each other.

6. A high density optical head assembly as defined in claim 4, further including a magnetic shield for magnetically shielding one of said pair of Faraday rotators.

7. A high density optical head assembly as defined in claim 1, further including a second polarizing beam splitter located in an optical path of the first light for deflecting the light component of the reflected light polarized in the first direction, and a servo section for receiving the light component deflected by the second polarizing beam splitter.

8. A high density optical head assembly as definied in claim 4, wherein said pair of Faraday rotators operate in synchrony with track jump operation of said optical head assembly.

* * * * *